United States Patent [19]

Koller

[11] Patent Number: 4,709,847

[45] Date of Patent: Dec. 1, 1987

[54] DEVICE FOR ASSEMBLING ELECTRICAL COMPONENTS ON A TERMINAL CARRIER PLATE

[75] Inventor: Franz Koller, Neuried, Fed. Rep. of Germany

[73] Assignee: Siemens Aktiengesellschaft, Berlin and Munich, Fed. Rep. of Germany

[21] Appl. No.: 886,587

[22] Filed: Jul. 16, 1986

[30] Foreign Application Priority Data

Jul. 23, 1985 [DE] Fed. Rep. of Germany ....... 3526329

[51] Int. Cl.⁴ ........ B23K 31/02

[52] U.S. Cl. ........ 228/49.1; 228/212

[58] Field of Search ........ 228/44.7, 49.1, 212; 269/91, 93, 254 CS, 903

[56] References Cited

U.S. PATENT DOCUMENTS 3,698,621 10/1972 Burke et al. ........ 228/44.7

4,508,327 4/1985 Ersoy ........ 269/91

4,560,152 12/1985 Miller ........ 269/91

4,567,938 2/1986 Turner ........ 269/903

4,582,245 4/1986 Cartwright ........ 228/212

*Primary Examiner*—M. Jordan

*Attorney, Agent, or Firm*—Mark H. Jay

[57] ABSTRACT

A strip is provided with a plurality of recesses beside which are arranged spring-mounted clamping levers which can be elevated and/or pivoted. By means of each lever, a component, e.g. a coil is clamped in a permanent and accurately known position above a terminal carrier plate, so that the components can be bonded on to the terminal carrier plates in the correct position, their terminals, e.g. the winding ends, can be welded to the terminal contacts of the terminal carrier plates, and electrical tests can also be carried out. The device in accordance with the invention is suitable as a production device for small biperforate core coils or annular core coils which are later to be used in film circuits.

13 Claims, 4 Drawing Figures

DEVICE FOR ASSEMBLING ELECTRICAL COMPONENTS ON A TERMINAL CARRIER PLATE

BACKGROUND OF THE INVENTION

The invention relates to a device for mounting electrical components (e.g. biperforate core and/or annular core coils, of the type which are used in particular in film circuits) to a terminal carrier plate which preferably consists of ceramic material and is equipped with a plurality of terminal contacts.

One object of the invention is to provide a production device by means of which such a component, e.g. the wound biperforate core or annular core, is maintained in the correct position on the terminal carrier plate during bonding, welding and testing.

SUMMARY OF THE INVENTION

In accordance with the invention, on the flat surface of a strip consisting of synthetic material are a plurality of recesses. The recesses correspond to the dimensions of the terminal carrier plates and accommodate the terminal carrier plates and are arranged in a longitudinal row. Adjacent each recess on the strip is located a spring-mounted clamping lever which can be elevated and/or pivoted and by means of which a component, e.g. a biperforate core coil or annular core coil is clamped in a permanent and accurately located position above a terminal carrier plate which has been previously inserted into the assigned recess. In this clamped state the component is bonded onto the terminal carrier plate in the provided position and its terminals (e.g. the winding ends of the coil) can be welded by thermo-compression to the terminal contacts of the terminal carrier plate.

Some of the recesses (which may be rectangular or square) can advantageously be oriented such that their edges are parallel or transverse to the longitudinal direction of the strip. Other recesses can be oriented so that their edges are at an angle of 45° with respect to the longitudinal direction of the strip. The biperforate core can thus, for example, be positioned parallel to, or at 45° with, the terminal carrier plate.

In order to clamp the components in fixed and accurately located positions, the clamping levers may advantageously contain indentations which mate with components, e.g. the coil cores. Advantageously, the indentations are arranged in the clamping levers in such manner that, for example, both horizontal and vertical coil cores may be safely supported.

The clamping levers are advantageously mounted in such a manner that they need only be slightly elevated before they may be turned and that when the clamping lever has been turned outwards the recess is freely accessible from above. This has the advantage of permitting the component and associated terminal carrier plate to be assembled from above.

Between upwardly-facing recess surfaces and the underside of the strip, bores extending vertically downwards may be advantageously arranged such that those points of the recesses at which the terminal contacts of the terminal carriers are located can be accessed from beneath the strip by an electric test adapted. The bores are advantageously conical and widen towards the bottom.

BRIEF DESCRIPTION OF THE DRAWINGS

Exemplary and non-limiting preferred embodiments of the invention are shown in the drawings, in which.

DETAILED DESCRIPTION OF PREFERRED EMBODIMENTS

Figure 1:
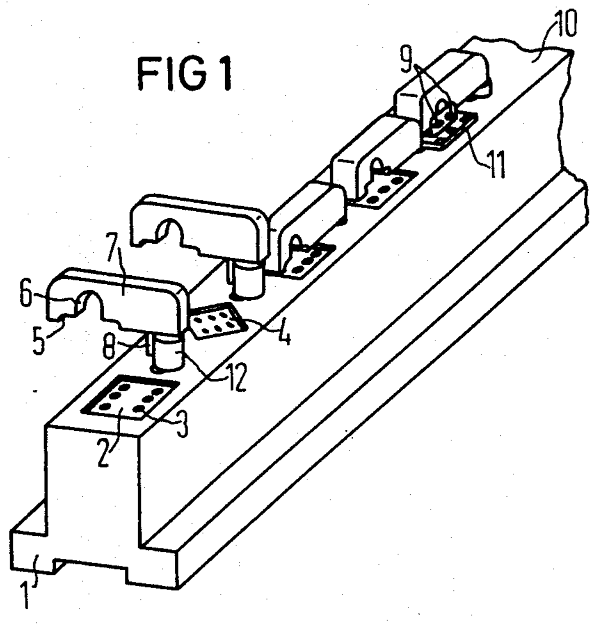
FIG. 1 is an oblique view of a preferred embodiment of the invention.

The preferred embodiment shown in perspective in FIG. 1 is used to mount biperforate core coils 9 to corresponding terminal carrier plates 11 (which preferably consist of ceramic material). The coils 9 (and annular core coils, which are assembled in the same manner and are not shown here) are later to be used in film circuits. The coil 9 is to be maintained in the correct position on the terminal carrier plate 11 during bonding, welding and testing.

A longitudinally elongated strip 1 is made of synthetic material. On the strip 11 are located elevatable and pivotable, spring-mounted clamping levers 7, which are arranged in holders 12. The strip 1, which is expediently produced by die-casting, accommodates a plurality—for example 9—coils 9 in a longitudinal row. The upper surface 10 of the strip 1 contains recesses 2,4 which correspond to the dimensions of the terminal carrier plates 11. In this example, the recess 2, which is rectangular, is arranged with its edges parallel to or transverse to the longitudinal direction of the strip 1, whereas the recess 4, which is likewise rectangular, is arranged with its edges at an angle of 45° to the longitudinal direction of the strip 1. Thus a coil 9 can be positioned parallel to the holder or rotated by 45°.

Each coil 9 is clamped by a spring-mounted clamping lever 7 on to its corresponding previously-inserted terminal carrier plate 11. The clamping levers 7, which are of synthetic material and are perferably produced by die-casting, are provided with indentations 5 and 6 which prevent the coil cores, and thus the coils 9 themselves, from slipping. The clamping levers 7 are maintained in the turned in state by adjusting posts 8 which are parts of the levers 7 and extend downwardly to the upper side 10 of the strip 1. This is accomplished by the springs 13 in holders 12 and the bores 14 in the strip 1 (shown in FIGS. 3 and 4). The indentations 5 and 6 are arranged on the underside of the clamping levers 7 in such a manner that both horizontal and vertical cores may be held safely. This determines the position of the cores, which simplifies the thermo-compression welding. When the clamping levers 7 are raised slightly, however, they can be turned outwards again. In the assembly of the coil 9 on the terminal carrier plate 11 this has the advantage that the manufacturing operations can be performed from above. When (see the top recess in FIG. 1) a biperforate coil 9 is clamped on strip 1 under the clamping lever 7, the wound core 9 can be bonded to the terminal carrier plate 11. Also in this state, the winding ends can be welded by thermo-compression and the whole assembly of coil 9 and plate 11 electrically tested.

Figure 2:
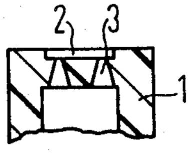
FIG. 2 is a cross-sectional portion of the embodiment of FIG. 1.

As can be seen from FIG. 2, commencing from the recess 2, conical bores 3 are provided. These correspond in number to the number of terminal contacts of a terminal carrier plate 11. Through these bores 3 can be introduced test probes (not shown) which can test the electrical characteristics of the coils 9.

The strip 1 is U-shaped in cross-section and is open at the bottom. At the base, the strip 1 is provided with a cross-section which widens towards the exterior.

Figure 3:
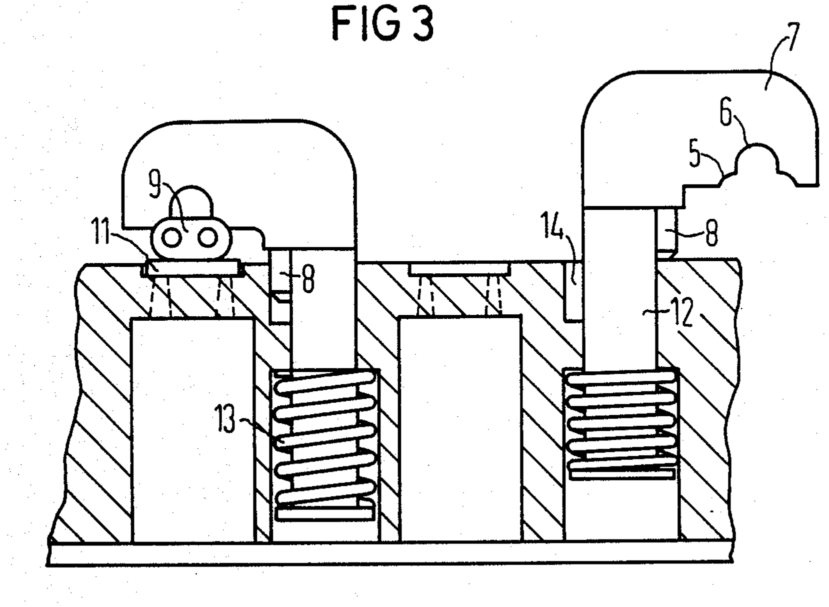
FIG. 3 is another cross-sectional portion of the embodiment of FIG. 1.
Figure 4:
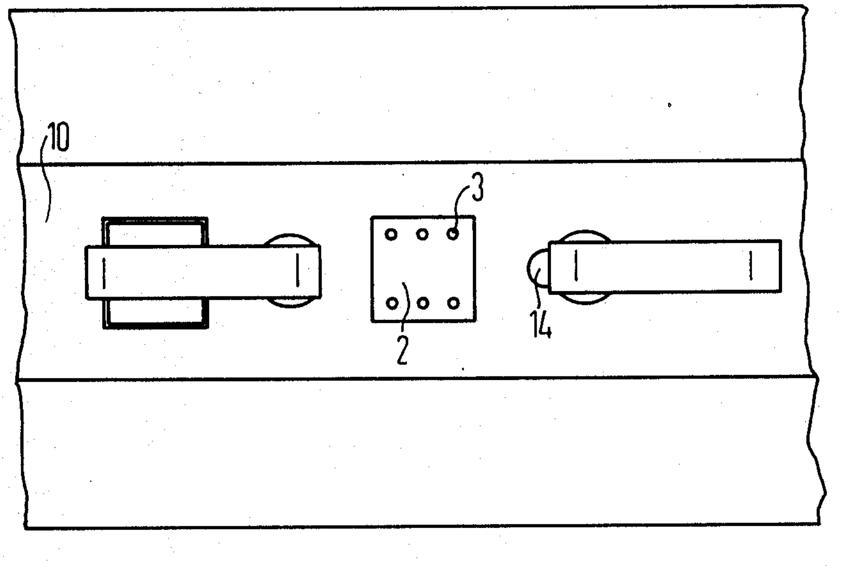
FIG. 4 is the portion shown in FIG. 3 in a top plan view.

As can be seen from FIGS. 3 and 4 a core coil 9 is clamped on to its corresponding carrier plate 11 by a clamping lever 7 by means of a spring 13 when the adjusting post 8 corresponds with an adjusting bore 14 in the axial direction. By raising the clamping levers 7 in the direction of the arrow the adjusting post 8 slips out of the bore 14 so that the clamping lever 7 is not caught any longer, and can be turned in the desired angular position.

Those skilled in the art will understand that changes can be made in the preferred embodiments here described, and that these embodiments can be used for other purposes. Such changes and uses are within the scope of the invention, which is limited only by the claims which follow.

What is claimed is:

1. A device for mounting electrical components such as coils to terminal carrier plates, comprising:

- a longitudinally elongated base of synthetic material, the base having a top surface in which is located a plurality of recesses, each recess being shaped to received a terminal carrier plate; and
- a like plurality of clamping means, each clamping means being associated with a corresponding one of the receses and comprising a movable arm which is spring-biased to releasably clamp an electrical component against a terminal carrier plate located in the corresponding recess.

2. The device of claim 1, wherein a bottom surface of each arm is shaped to mate with a component to be clamped.

3. The device of claim 2, wherein each arm has an indentation which is shaped to mate with both horizontal and vertical coil cores.

4. The device of claim 1, wherein each arm is rotatable between a first position in which the corresponding recess is unobstructed from above and a second position in which an electrical component is clamped, and wherein the device further comprises means for individually maintaining each of the arms in the second position and permitting rotation of the arm between the first and second positions upon a lifting of the arm with respect to the base.

5. The device of claim 4, wherein each maintaining means comprises a vertically and downwardly extending post mounted to the movable arm and a bore in the top surface of the base for taking the post in the clamping position of the arm.

6. The device of claim 1, wherein a plurality of bores in the base communicate with each recess, the bores being so located that when a terminal carrier plate is placed in a recess, each of the terminal contacts on the terminal carrier plates is located at one end of a bore.

7. The device of claim 6, wherein each of the bores is generally conical with a minimum diameter adjacent the corresponding recess.

8. The device of claim 1, wherein the base is hollow, has a generally U-shaped cross-section and is open at the bottom.

9. The device of claim 8, wherein the interior of the base becomes progressively wider towards its bottom.

10. The device of claim 1, wherein at least one recess is rectangular and has sides which are parallel to and perpendicular to the longitudinal edges of the base.

11. The device of claim 1, wherein at least one recess is rectangular and has sides which at at 45° with respect to the longitudinal edges of the base.

12. The device of claim 1, wherein the base is die-cast.

13. The device of claim 1, wherein each arm is of synthetic material and is die-cast.

* * * * *